Patented June 15, 1948

2,443,290

UNITED STATES PATENT OFFICE 2,443,290

FLOUR PRODUCT AND METHOD FOR THE PREPARATION THEREOF

Jordan V. Bauer, Elmwood Park, Ill., assignor, by mesne assignments, to Stein, Hall & Co., Inc., a corporation of New York No Drawing. Application April 30, 1943, Serial No. 485,204

14 Claims. (Cl. 106—150)

This invention relates to a new and improved flour product and a new and improved method for the preparation thereof.

This application is a continuation-in-part of Serial No. 400,147, filed June 27, 1941, now abandoned.

Commercial flours of the types derived from cereal grains are known to have many disadvantages for industrial uses, as compared with relatively pure starches. These disadvantages result largely from the fact that flours contain not only starch but also protein. This is especially true of certain types of flours such as, for example, wheat and rye flours. The presence of the protein modifies the characteristics of the flours as a whole and, among other things, interferes with the dispersibility of the flours in water. Thus, ordinary flour, instead of dispersing to a slurry as does starch, tends to form doughy lumps which are very difficult to disperse. Also, when subjected to agitation or a beating action whole flours foam excessively and therefore cannot be used satisfactorily in industrial processes where any great amount of agitation is present. For these reasons flours have not heretofore presented very promising possibilities for industrial usages.

One of the objects of this invention is to provide a new and improved type of flour product which is free from the disadvantages above enumerated.

Another object of the invention is to provide a new and improved method for producing a flour product of the type described.

A more specific object of the invention is to provide a new and improved type of flour product which will disperse in water to form a relatively thin slurry without lumping up or forming a dough.

Still another specific object of the invention is to provide a new and improved type of flour product which can be subjected to agitation in industrial usages without excessive foaming.

Another object of the invention is to provide a new and improved type of flour product which is relatively stable.

In accordance with the invention, these objects are accomplished by treating cereal flours with a formaldehyde under substantially dry conditions, or in the presence of insufficient moisture to form a dough. The expression "a formaldehyde" is employed herein to cover formaldehyde and compounds or compositions which liberate formaldehyde, e. g., paraformaldehyde, formaldehyde gas, and commercial solutions of formaldehyde. It is important for the purpose of the invention, however, that the formaldehyde be used in such form that it may be intimately dispersed with the discrete particles of the flour. Paraformaldehyde in powder form is capable of such intimate dispersion and is very suitable for this purpose. Gaseous formaldehyde is readily absorbed by the flour and may be introduced by any of the well known methods of treating dry pulverulent materials with gaseous chemicals. The same is true with commercial liquid formaldehyde which, if used, is preferably introduced as a fine spray, so that it can be disseminated through the flour and not cause the formation of doughy particles due to large local concentrations of moisture. Another method of introducing formaldehyde in aqueous solution form is to disperse it in a portion of dry pulverulent material such as powdered starch or clay which may subsequently be blended with the flour and liberates formaldehyde in situ.

The treatment of the flour may be effected at ordinary temperatures, say 75° F., or at elevated temperatures. If ordinary temperatures are employed, the percentage of the formaldehyde compound required is somewhat greater than that required at elevated temperatures. Thus, with ordinary or relatively low temperature conditions as little as 0.1% has been found to be effective, while with elevated temperature conditions, for example say 250° F., somewhat smaller amounts are effective, a definite effect being obtained with as little as 0.02%. Among other things, the aldehyde acts on the protein of the flour to harden it.

It is known that if starches are roasted long enough at high enough temperatures, say around 300° F. or perhaps somewhat higher, the starches will be sufficiently degraded to form dextrines or other starch modification products. One of the objects of this invention, however, is to provide a flour product in which the starchy portion thereof is substantially unmodified or unconverted, and therefore it is desirable in the practice of the invention to avoid such excessive heating of the product that would cause the starch component of the flour to be substantially modified or converted.

For the purposes of this invention it is desirable that the flour be treated with formaldehyde under substantially dry conditions. By the term "substantially dry conditions" I wish to distinguish between my treatment of the flour in a powdered pulverulent form rather than in the form of a dough or a slurry. It should be understood, however, that normal amounts of moisture may be present. Generally speaking, not more than 1% of the formaldehyde compound, e. g., paraformaldehyde, based on the weight of flour is necessary to produce the desired products. Somewhat greater amounts may be used up to say about 5% but are usually deemed to be unnecessary. The use of the larger proportion of formaldehyde gives a more definite effect in a shorter period of time.

The time required to effect the treatment of the flour in order to obtain a product having the characteristics previously mentioned will, as previously indicated, vary somewhat depending upon the proportion of formaldehyde and the temperature used. Thus, at ordinary temperatures an appreciable effect is obtained in one day (24 hours) but about 7 days (168 hours) is usually required to obtain the maximum effect; on the other hand, at a temperature of 250° F. the result can be accomplished by roasting an intimate blend of the paraformaldehyde and flour for 1 to 1½ hours or for a longer period, say 6 hours, if desired. The flour and formaldehyde compound are coacted for a period sufficiently long to produce a product which forms dispersions in water substantially without lumping or forming dough, as contrasted with the original untreated flour which readily lumps, balls or forms a dough when attempts are made to disperse it. These dispersions of the new products herein produced, moreover, exhibit reduced foaming characteristics, as compared with the original untreated flour. The roasting may be carried out at higher temperatures, below those at which charring occurs, for shorter periods of time which are preferably insufficiently long to bring about substantial modification of the starchy content of the flour.

Flours naturally having a pH around 6.0 to 6.5, especially wheat flours and rye flours, are well suited to the practice of the invention. The presence of too much acidity during the reaction of the flour with the formaldehyde compound is to be avoided because under substantially acid conditions formaldehyde will react with the starch component of the flour and tend to render it less capable of being completely gelatinized when cooked with water. For the purposes of my invention this condition is undesirable. I have found that by keeping the pH of the flour mixture above 5.0 the action of the formaldehyde is confined to the protein component of the flour and the starch component is not appreciably affected. A preferred pH is from about 6 to about 9.

The products produced in accordance with the invention are in pulverulent or powder form and are readily dispersible in water to form thin slurries with say 4 parts of water per part of flour product. They may be gelatinized in water by heating in the usual manner and do not foam excessively when agitated or beaten in the presence of water, nor do they tend to thin out. Furthermore, they are stable in both the solid and dispersed forms.

The invention will be further understood but is not limited by the following examples in which the proportions are given in parts by weight unless otherwise indicated:

Example I 100 parts of white rye flour was blended at 75° F. with 0.3% of paraformaldehyde and the blend was allowed to stand for 7 days.

At the end of that time the pulverulent product was found to be readily dispersible in water to form a thin slurry with 4 parts of water per part of the product. This product was found to be useful as a corrugating adhesive, as a beater size in paper making, as a rug anchor size, and as a practical substitute for starch in many applications where starch has heretofore been used and where flour could not be used satisfactorily.

Example II 100 parts of white rye flour was intimately blended with 0.1% of paraformaldehyde and the blend was roasted at 250° F. for 1 to 1½ hours. The product obtained was found to be very readily dispersible in water to form thin slurries with 4 parts of water per part of the product. Dispersions of the product in water did not foam excessively when used as a beater size in paper making, nor did the product tend to form balls or dough when dispersed in water. It was relatively stable in the powder or solid form and likewise when dispersed in water formed relatively stable dispersions which did not tend to thin out excessively on standing. This product also was found to be useful as a corrugating adhesive, as a size in the manufacture of paper, textiles, rug anchor, and as a practical general substitute for starch.

Example III

A product was prepared as described in Example II except that the flour was neutralized by the addition of a small amount of soda ash before being blended with the paraformaldehyde. A product of excellent dispersibility was obtained with other characteristics and uses similar to those described with respect to the product of Example II.

Example IV

A mixture of 9 parts corn starch and 1 part soda ash was moistened with 1 part of a 37% solution of formaldehyde. This resultant mixture was thoroughly blended with 90 parts of rye flour and allowed to stand for 7 days at a temperature of about 75° F. At the end of that time the pulverulent product was much more readily dispersible in water and its tendency to foam on being agitated was greatly reduced as compared to the original flour.

It was similar in characteristics to those products of the previous example and is suitable for the same usages.

It will be understood that the various products may differ somewhat in their characteristics, depending upon whether they are formed with or without heating and also upon the particular type of flour used. The best results in the practice of the invention have been obtained by the use of rye flour. White rye flour, which is the flour obtained from the interior of the rye berry, is preferred, although other grades may be used. The darker grades are undesirable, however, for most purposes. Wheat flour, preferably the first and second clear grades, may be employed instead of rye flour in the examples given. The invention can also be applied in the manufacture of new and improved flour products from other types of flours containing a substantial amount of protein or gluten and especially those types which also contain a relatively large amount of starch. However, for practical purposes the products from wheat and rye flours are preferred in the practice of the invention.

As will be understood, the flour products of this invention are readily and completely gelatinizable when heated with water at temperatures above the gelatinization temperatures of the starchy portions thereof, i. e., the starch granules are burst, as distinguished from certain pure starch products heretofore known and made by treating starches with acids and formaldehyde. These latter products, although varying somewhat in their properties, tend to swell in water and for the most part the granules do not burst at ordinary gelatinization temperatures.

The products of the invention are capable of wide use where substantially pure starches have heretofore been employed. Since they exist in a pulverulent state they are readily shipped and stored as such. When used as a beater size, products of the invention may be added directly in their solid or powder form to the beater, or they may be dispersed in water prior to their addition to the beater. They can likewise be used in a tub size or other types of paper sizes, in sizing or finishing compositions for textiles and for many different purposes in adhesives. They are especially suited, for example, for use in forming the potentially adhesive inert ungelatinized amylaceous substance of the adhesives described in U. S. Patent No. 2,102,937, and the adhesives thus prepared are especially suited for the manufacture of corrugated board as described in U. S. Patent No. 2,051,025.

The product as made from rye flour is particularly of value as a beater size in those types of operations wherein the sizing material is added in a non-cooked state to the beater or head box of the paper machine, and subsequently becomes cooked or gelatinized "in situ" when the paper sheet is passed over the drying rolls of the machine. The low gelatinization temperature of the starch component of the product made from rye flour is one of the features responsible for its favorable performance in this type of usage.

The invention has the advantage of providing a flour product which can be used for many industrial applications in place of starch and which is free from the disadvantages of ordinary whole flours. Other advantages will be apparent to those skilled in the art.

Having thus described the invention, what I claim as new and desire to secure by Letters Patent of the United States is:

1. The product of the reaction of a substantially undegraded rye flour with 0.02% to 5% of paraformaldehyde under substantially dry conditions at a pH within the range from about 6 to about 9, said product having the property of dispersing in water substantially without lumping or forming a dough to produce dispersions which exhibit reduced foaming characteristics as compared with similar dispersions of the original untreated flour and which are substantially stable against changes in viscosity on standing, said product also being gelatinizable when heated in water.

2. A process of treating cereal flour to produce a readily water dispersible, gelatinizable product which comprises intimately blending and coacting 0.02% to 5% of a formaldehyde with an undegraded cereal flour containing starchy and protein components under substantially dry conditions at a pH in excess of about 5, and under temperature conditions insufficiently high and for a period insufficiently long to bring about substantial modification of the starchy content of the flour until the flour is rendered capable of forming dispersions in water substantially without lumping or forming a dough, said dispersions exhibiting reduced foaming characteristics as compared with the original untreated flour and the starchy components thereof being gelatinizable upon heating.

3. A process as claimed in claim 2 in which the formaldehyde is paraformaldehyde.

4. A process as claimed in claim 2 in which the formaldehyde is introduced in the form of gaseous formaldehyde.

5. A process as claimed in claim 2 in which the formaldehyde is introduced in the form of a pulverulent formaldehyde treated starch.

6. A process of treating flour which comprises intimately blending and coacting 0.02% to 5% paraformaldehyde with an undegraded cereal flour containing starchy and protein components under substantially dry conditions at temperatures and for a period of time insufficient to substantially degrade the starchy portion of the flour at a pH within the range from about 6 to about 9 until the resultant product forms dispersions in water substantially without lumping or forming dough, which dispersions exhibit reduced foaming characteristics as compared with the original untreated flour, the starchy components of the resultant product being gelatinizable upon heating in the presence of water.

7. A process of preparing new and improved flour products which comprises intimately blending and coacting about 0.02% to 5% of a formaldehyde with a substantially undegraded cereal flour containing starchy and protein components, based on the weight of the flour, under substantially dry conditions at temperatures within the range of about 75° F. to about 250° F. at a pH within the range from about 6 to about 9 for a period of time within the range from 1 hour to 168 hours sufficiently long to produce a flour product, the aqueous dispersions of which exhibit reduced foaming characteristics as compared with similar dispersions of the original untreated flour and are gelatinizable upon heating.

8. A process as claimed in claim 7 in which the flour is a rye flour.

9. A process as claimed in claim 7 in which the flour is a wheat flour.

10. A process of treating flour which comprises intimately blending and coacting a substantially undegraded whole cereal flour containing starchy and protein components and about 0.02% to about 1% of paraformaldehyde, based on the weight of the flour, under substantially dry conditions, at a pH from about 6 to about 7, at temperatures within the range from about 75° F. to about 250° F. for a period of time from about 1 hour to 168 hours sufficiently long to produce a product, the aqueous dispersions of which exhibit reduced foaming characteristics as compared with similar dispersions of the original untreated flour and are gelatinizable upon heating.

11. A flour product formed by intimately blending 0.02% to 5% by weight of a formaldehyde with an undegraded cereal flour containing starchy and protein components under substantially dry conditions at temperatures and for a period of time insufficient to substantially degrade the starchy portion of the flour at a pH in excess of 5 until the resultant product forms dispersions in water substantially without lumping or forming a dough, which dispersions exhibit reduced foaming characteristics as compared with the original untreated flour and the starchy components of which are gelatinizable upon heating.

12. A flour product formed by intimately blending 0.02% to 5% by weight of paraformaldehyde with an undegraded cereal flour containing starchy and protein components under substantially dry conditions at temperatures and for a period of time insufficient to substantially degrade the starchy portion of the flour at a pH from about 6 to about 9 until the resultant product forms dispersions in water substantially without lumping or forming a dough, which dispersions exhibit reduced foaming characteristics as compared with the original untreated flour and the starchy components of which are gelatinizable upon heating.

13. A flour product formed by intimately blending 0.02% to 5% by weight of a formaldehyde with a substantially undegraded cereal flour containing starchy and protein components under substantially dry conditions at temperatures within the range of about 75° F. to about 250° F. at a pH within the range of about 6 to about 9 for a period of time within the range from 1 hour to 168 hours sufficiently long to produce a flour product, the aqueous dispersions of which exhibit reduced foaming characteristics as compared with similar dispersions of the original untreated flour and are gelatinizable upon heating.

14. A gelatinizable flour product exhibiting reduced foaming characteristics as compared with the undegraded whole cereal flour from which it is derived, said product being formed by intimately blending about 0.02% to about 1% by weight of paraformaldehyde with a substantially undegraded whole cereal flour containing the usual starchy and protein components under substantially dry conditions at a pH from about 6 to about 7 at temperatures within the range from about 75° F. to about 250° F. for a period of time from about 1 hour to 168 hours, depending upon the temperature used, but in any case sufficiently long to produce a product, the aqueous dispersions of which exhibit reduced foaming characteristics as compared with similar dispersions of the original untreated flour and which are gelatinizable upon heating.

JORDAN V. BAUER.

REFERENCES CITED

The following references are of record in the file of this patent:

UNITED STATES PATENTS

| Number | Name | Date |
|---|---|---|
| 2,326,118 | Bauer et al. | Aug. 10, 1943 |
| 2,246,635 | Moller | June 24, 1941 |
| 2,222,872 | Leuck | Nov. 26, 1940 |
| 2,148,525 | Bauer et al. | Feb. 28, 1939 |
| 2,134,764 | Leuck | Nov. 1, 1938 |
| 2,113,034 | Rowland et al. | Apr. 5, 1938 |
| 2,099,765 | Horst et al. | Nov. 23, 1937 |
| 1,983,732 | Beyer | Dec. 11, 1934 |
| 602,697 | Classen | Apr. 19, 1898 |